(12) United States Patent  
Matsumoto et al.

(10) Patent No.: US 11,437,069 B2  
(45) Date of Patent: Sep. 6, 2022

(54) MAGNETIC RECORDING AND REPRODUCING DEVICE

(71) Applicants: Kabushiki Kaisha Toshiba, Tokyo (JP); Toshiba Electronic Devices & Storage Corporation, Tokyo (JP)

(72) Inventors: Takuya Matsumoto, Tokyo (JP); Hiroshi Isokawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/378,001

(22) Filed: Jul. 16, 2021

(65) Prior Publication Data

US 2022/0115039 A1   Apr. 14, 2022

(30) Foreign Application Priority Data

Oct. 8, 2020 (JP) .............................. JP2020-170603

(51) Int. Cl.
*G11B 5/00* (2006.01)
*G11B 13/08* (2006.01)

(52) U.S. Cl.
CPC ...... *G11B 13/08* (2013.01); *G11B 2005/0021* (2013.01)

(58) Field of Classification Search
CPC ..... G11B 13/08; G11B 5/4866; G11B 5/6088; G11B 7/126; G11B 2005/0021; G11B 5/00813; G11B 5/012; G11B 5/54; G11B 5/59633; G11B 5/59638; G06F 3/0638; G06F 3/0604; G06F 12/08
USPC .................................................. 360/59, 324
See application file for complete search history.

(56) References Cited

U.S. PATENT DOCUMENTS

| | | | |
|---|---|---|---|
| 5,666,334 A | 9/1997 | Tokuyama et al. | |
| 8,755,254 B2 | 6/2014 | Seigler et al. | |
| 8,848,306 B2 | 9/2014 | Sakai et al. | |
| 9,569,121 B1* | 2/2017 | Rausch | G11B 5/02 |
| 9,741,364 B2 | 8/2017 | Rausch et al. | |
| 10,360,928 B1 | 7/2019 | Brockie | |
| 10,802,739 B1* | 10/2020 | Weber | G06F 3/061 |

FOREIGN PATENT DOCUMENTS

JP       H06-251437 A       9/1994

* cited by examiner

*Primary Examiner* — Nabil Z Hindi
(74) *Attorney, Agent, or Firm* — Knobbe, Martens, Olson & Bear, LLP (57) ABSTRACT

According to one embodiment, a magnetic recording and reproducing device includes a perpendicular magnetic recording medium, a perpendicular magnetic recording head, a thermal assisted magnetic recording medium, and a thermal assisted magnetic recording head.

10 Claims, 10 Drawing Sheets

FIG. 15 ated magnetic recording method has been developed as a recording technology that can achieve higher recording density than that of the conventional perpendicular magnetic recording method.

MAGNETIC RECORDING AND REPRODUCING DEVICE

CROSS-REFERENCE TO RELATED APPLICATIONS

This application is based upon and claims the benefit of priority from Japanese Patent Application No. 2020-170603, filed Oct. 8, 2020, the entire contents of which are incorporated herein by reference.

FIELD

Embodiments described herein relate generally to a magnetic recording and reproduction device.

BACKGROUND

In recent years, in the field of magnetic recording and reproducing devices, a thermal assisted magnetic recording method has been developed as a recording technology that can achieve higher recording density than that of the conventional perpendicular magnetic recording method.

The thermal assisted magnetic recording method uses a magnetic recording medium comprising a magnetic recording layer having a perpendicular magnetic anisotropy higher than the perpendicular magnetic anisotropy of the magnetic recording layer of conventional perpendicular magnetic recording medium, and a magnetic head comprising an optical near-field transducer. When written data, near-field light is irradiated from a distal end of an optical near-field transducer of the magnetic head to locally heat the magnetic recording layer. Thus, the coercive force of the heated part of the magnetic recording layer is lowered sufficiently during recording, thus enabling high recording density.

However, when generating the near-field light, heat is generated inside the optical near-field transducer. When the heat generation by recording is repeated, migration of atoms occurs in the materials which constitute the optical near-field transducer, causing deformation of the optical near-field transducer to deteriorate. Therefore, it is difficult in the thermal assisted magnetic recording method, to maintain the quality of the signal recorded, which creates such a drawback that it difficult to ensure reliability over a long period of term.

Conventionally, the problem of concentration of write access to the thermal assisted magnetic recording head has not been attended, and there is a demand of ensuring reliability by attending the degradation of the optical near-field transducer.

DETAILED DESCRIPTION

In general, according to one embodiment, a magnetic recording and reproducing device comprises, within one magnetic recording and reproducing device, a magnetic recording medium for perpendicular magnetic recording, a magnetic head for perpendicular magnetic recording, a magnetic recording medium for thermal assisted magnetic recording, and a magnetic head for thermal assisted magnetic recording. The magnetic recording and reproducing device are equipped with at least two recording functions in one magnetic recording and reproducing device: the conventional perpendicular magnetic recording (PMR) method and the thermal assisted magnetic recording (TAMR) method. With this configuration, it is possible to use the recording functions of the conventional PMR method and the TAMR method in different situations as needed. For example, hot data with high access frequency among the data to be stored can be recorded using the conventional PMR method, whereas cold data with low access frequency can be recorded using the TAMR method.

According to the magnetic recording and reproducing device according to the embodiments, the recording functions are used in different ways, and thus the concentration of write access to the TAMR head and the degradation of the optical near-field transducer due to this can be suppressed, thus enabling both high recording density by the TAMR method and long-term reliability at the same time.

Hereinafter, a disk device as a magnetic recording and reproducing device according to the embodiment will be described with reference to the drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

First Embodiment

As a magnetic recording and reproducing device, a hard disk drive (HDD) of the first embodiment will be described in detail.

Figure 1:
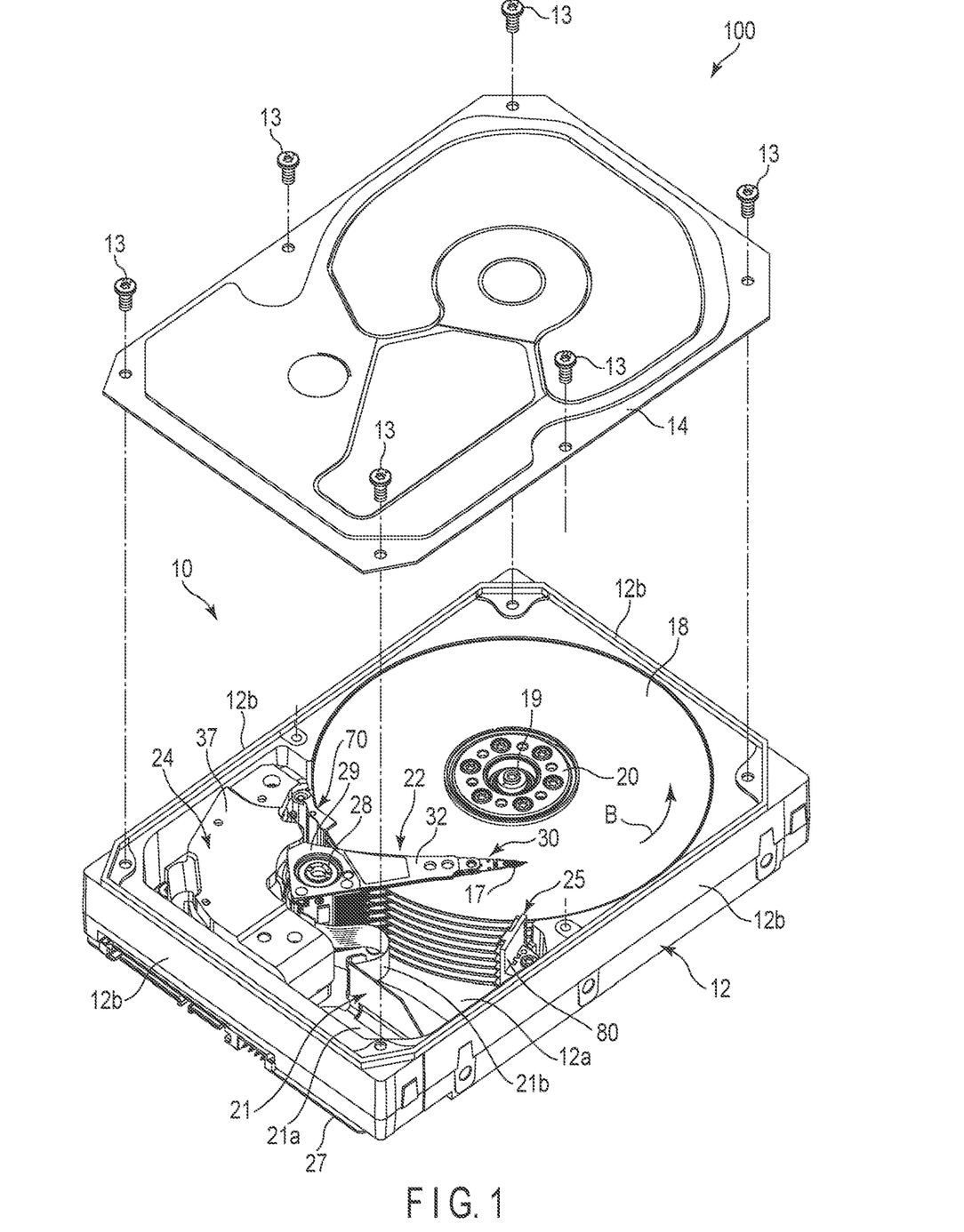
FIG. 1 is an exploded perspective diagram of an HDD according to an embodiment.

FIG. 1 is an exploded perspective view of an HDD according to the embodiment, when a cover thereof is removed.

As shown in FIG. 1, the HDD 100 comprises a rectangular-shaped housing 10. The housing 10 includes a rectangular box-shaped base 12 with an upper surface open and a cover (top cover) not shown in the figure. The base 12 includes a rectangular-shaped bottom wall 12a and side walls 12b standing along the edges of the bottom wall, which are integrally molded as one body, for example, of aluminum. The cover is formed as a rectangular plate from stainless steel, for example, and can be fixed with screws onto the side walls 12b of the base 12 to airtightly close the upper opening of the base 12.

As shown in FIG. 1, the housing 10 accommodates a plurality of magnetic disks arranged to oppose each other, or magnetic disks 18 as disk-shaped magnetic recording media, and a spindle motor 19 which supports and rotate the magnetic disks 18. The spindle motor 19 is disposed on the bottom wall 12a. Each magnetic disk 18 is, for example, formed into a discoidal shape a with a diameter of 95 mm (3.5 inches) and includes a substrate made of a non-magnetic material, for example, glass, and magnetic recording layers formed respectively on the upper (first) and lower (second) surfaces of the substrate. The magnetic disk 18 is fitted into a hub on a common spindle, which is not shown in the figure, and is further clamped by a clamping spring 20. With this structure, the magnetic disks 18 are supported in positions parallel to the bottom wall of the base 12. The magnetic disks 18 are rotated in a direction of arrow B at a predetermined number of revolutions by the spindle motor 19.

The housing 10 accommodates therein a plurality of magnetic heads 17 which record and reproduce data with respect to the magnetic disks 18, respectively, and an actuator assembly 22 which movably supports the magnetic heads 17 in relation to the magnetic disks 18, respectively. The housing 10 further accommodates therein a voice coil motor (VCM) 24 which rotates and positions the actuator assembly 22, a ramp load mechanism 25 which holds the magnetic heads 17 in respective unloaded positions away from the respective magnetic disks 18 when a magnetic head 17 is moved to the outermost circumference of the respective magnetic disk 18, a substrate unit (FPC unit) 21 on which electronic components such as connectors, etc., are mounted, and a spoiler 70.

To the outer surface of the bottom wall 12a of the base 12, a printed circuit board 27 is fixed with screws. The printed circuit board is configured as a control unit which controls the operation of the spindle motor 19, and also the operation of the VCM 24 and the magnetic heads 17 via the substrate unit 21.

The actuator assembly 22 comprises a bearing portion 28 fixed on the bottom wall 12a of the base 12, a plurality of arms 32 extending from an actuator block (not shown) provided on the bearing portion 28, suspension assemblies(, which may be each referred to as a head gimbal assembly: HGA) 30 attached to each arm 32, and the magnetic heads 17 supported by the suspension assembly 30. Suspension 34, each of which has a proximal end fixed to a distal end of the respective arm 32 by spot welding or bonding, and extend out from the arms 32, respectively. Each magnetic head 17 is supported on an extended end of the respective suspension 34. During recording, the suspensions 34 and the magnetic heads 17 respectively face each other with the respective magnetic disk 16 interposed therebetween.

Figure 2:
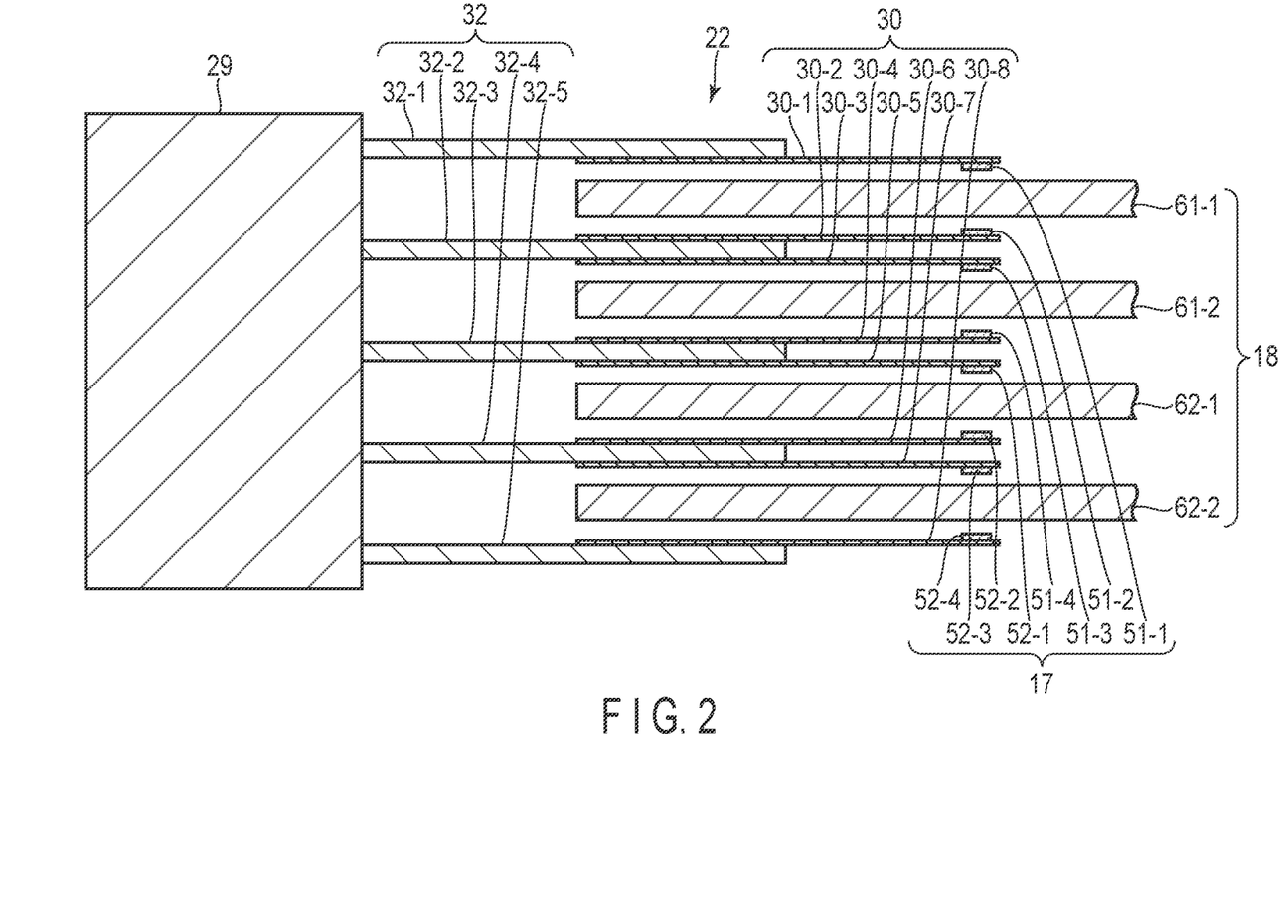
FIG. 2 is a diagram schematically showing an example of the configuration of the first embodiment.

FIG. 2 is a diagram schematically showing the structure of the actuator assembly and the magnetic disks used in FIG. 1.

Here, for the sake of illustration, the actuator assembly 22 is loaded on the magnetic disks 18.

As the magnetic disks 18, magnetic disks 61-1 and 61-2 for PMR and magnetic disks 62-1 and 62-2 for TAMR are rotatably mounted on a common spindle (not shown) in order from the top to the bottom wall 12a of the base 12 and are supported at predetermined intervals, parallel to each other and parallel to the bottom wall of the base 12. There are arms 32 one more in number than the number of magnetic disks 61-1, 61-2, 62-1 and 62-2. The magnetic heads 17 includes twice as many heads as the number of the magnetic disks.

In the actuator assembly 22, a plurality of arms 32-1, 32-2, 32-3, 32-4 and 32-5 extend from one common actuator block 29. The actuator block 29 is rotatably mounted on the bearing portion 28. One suspension assembly 30-1 is attached to the uppermost arm 32-1, and one suspension assembly 30-8 is attached to the lowermost arm 32-5. To the inbetween arms 32-2, 32-3 and 32-4, pairs of suspension assemblies 30-2 and 30-3, suspension assemblies 30-4 and 30-5 and suspension assemblies 30-6 and 30-7 are attached respectively to the arms 32-2, 32-3 and 32-4.

Magnetic heads 51-1, 51-2, 51-3 and 51-4 for PMR are supported on the distal ends of the suspension assemblies 30-1, 30-2, 30-3 and 30-4, respectively. Thus, the PMR magnetic heads 51-1 and 51-2 are arranged to oppose each other while interposing the PMR magnetic disk 61-1 therebetween. Further, the PMR magnetic heads 51-3 and 51-4 are arranged to oppose each other while interposing the PMR magnetic disk 61-2 therebetween. With this arrangement, the PMR magnetic heads 51-2 and 51-3 are adjacent to each other back to back.

As in the case of the PMR magnetic heads 51-1, 51-2, 51-3 and 51-4, the TAMR magnetic heads 52-1, 52-2, 52-3 and 52-4 are supported on the distal ends of the suspension assemblies 30-5, 30-6, 30-7 and 30-8, respectively, attached to the arms 32-3, 32-4 and 32-5 extending from the common actuator block 29. The TAMR magnetic heads 52-1 and 52-2 are arranged to oppose each other while interposing the TAMR magnetic disk 62-1 therebetween. The PMR magnetic head 51-4 and the TAMR magnetic head 52-1 are arranged to be adjacent to each other back to back, and so are the TAMR magnetic head 52-2 and the TAMR magnetic head 52-3.

As described above, in the first embodiment, the PMR magnetic heads 52-1, 52-2, 52-3 and 52-4 and the TAMR magnetic heads 51-1, 51-2, 51-3 and 51-4 are provided to correspond respectively to the PMR magnetic disks 61-1 and 61-2 and the TAMR magnetic disks 62-1 and 62-2.

The TAMR method uses a magnetic head comprising an optical near-field transducer, and during data writing, near-field light is irradiated from the distal end of the optical near-field transducer element to a recording layer of a medium, which as high perpendicular magnetic anisotropy, and thus the recording layer is locally heated. Thus, the coercive force of the heated portion of the recording layer is sufficiently reduced during recording, thus enabling high recording density.

However, when generating near-field light, heat is generated inside the optical near-field transducer. Repeated heat generation causes migration of atoms in the materials that make up the optical near-field transducer, thus making it difficult to maintain the quality of the recorded signal. For this reason, it is not conventionally easy to ensure the long-term reliability of such devices.

In contrast, according to the first embodiment, since one magnetic recording and reproducing device is equipped with two recording functions, the conventional PMR method and the TAMR method. With this structure, the two recording functions can be used in different ways as appropriate, for example, when setting the method of storing data on a magnetic disk from a host computer connected to the magnetic recording and reproducing device, hot data, which is accessed more frequently, is recorded using the PMR magnetic head and magnetic disk, whereas cold data, which is accessed less frequently, is recorded using the TAMR magnetic head and magnetic disk. In this way, the concentration of write access to the TAMR magnetic head can be suppressed, making it possible to ensure both high-density recording by the TAMR recording method and long-term reliability.

Figure 3:
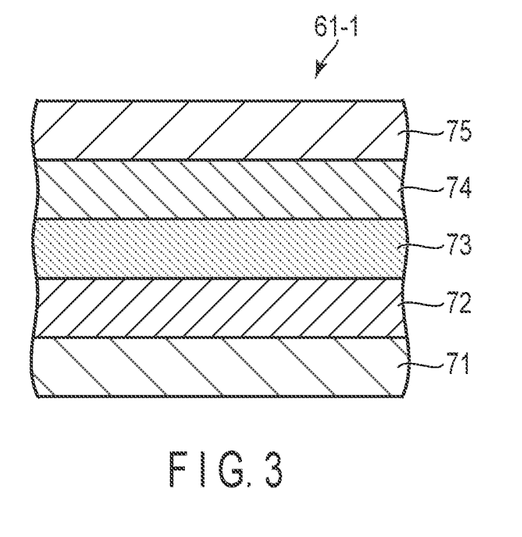
FIG. 3 is a cross-sectional view showing an example of the configuration of a PMR magnetic disk which can be used in the embodiment.

FIG. 3 is a cross-sectional view of an example of the configuration of a PMR magnetic disk which can be used in the embodiment.

The PMR magnetic disk 61-1, as a perpendicular magnetic recording medium, may comprise, for example, a substrate 71, a soft magnetic layer 72 provided on the substrate 71, a crystal orientation layer 73 provided on the soft magnetic layer 72 to improve the orientation of the crystals of the perpendicular magnetic recording layer, a perpendicular magnetic recording layer 74, as a perpendicular magnetic recording layer, provided on the crystal orientation layer 73 and having anisotropy in the perpendicular direction to the disc surface, and a protective layer 75 provided on the perpendicular magnetic recording layer 74. The PMR magnetic disk 61-2 can as well have a structure similar to that of the PMR magnetic disk 61-1.

Figure 4:
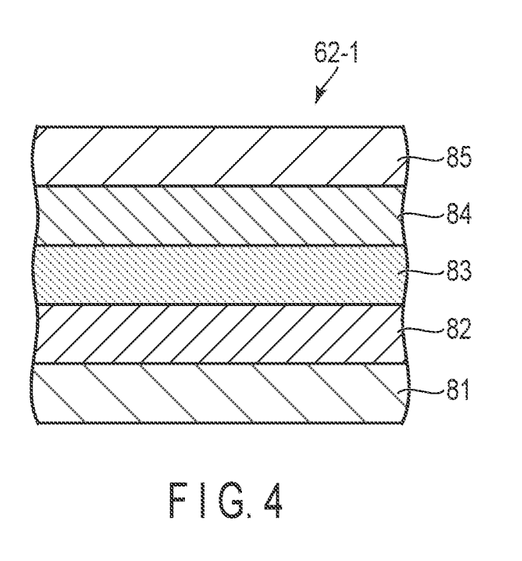
FIG. 4 is a cross-sectional view showing an example of the configuration of a TAMR magnetic disk which can be used in the embodiment.

FIG. 4 is a cross sectional view showing an example of the configuration of a TAMR magnetic disk which can be used in the embodiment.

The TAMR magnetic disk 62-1, as a thermal assisted magnetic recording medium can comprise, for example, a substrate 81, a heat sink layer 82 provided on the substrate 81 and disposed under a crystal orientation layer to suppress the expansion of the heating area, a crystal orientation layer 83 disposed on a lower layer portion of the perpendicular magnetic recording layer to improve the orientation of the perpendicular magnetic recording layer, a perpendicular magnetic recording layer 84, as a thermal assisted magnetic recording layer, having a great anisotropy in the perpendicular direction to the disk surface, and a protective layer 85 provided on the perpendicular magnetic recording layer 84. The TAMR magnetic disk 62-2 can as well have a structure similar to that of the TAMR magnetic disk 62-1.

The perpendicular magnetic recording layer that can be used for PMR magnetic disks and TAMR magnetic disks may contain platinum and at least one of iron and cobalt.

Usable examples of the material for the perpendicular magnetic recording layer of the PMR magnetic disk are CoCrPt, CoCrTa, etc.

The soft magnetic layer used in the PMR magnetic disc is provided between the perpendicular magnetic recording layer and the substrate, and serves a part of the function of the magnetic head, that is, to pass the recording magnetic field from the single-pole head to magnetize the perpendicular magnetic recording layer in the horizontal direction and return it to the magnetic head side. Thus, a steep and sufficient perpendicular magnetic field is applied to the recording layer to improve the recording and reproduction efficiency. Usable examples of the material for the soft magnetic layer are CoZr, CoZrNb, CoZrTa, etc.

For example, Ru, Ru alloy, Ni alloy or the like can be used the material of the crystal orientation layer used for the PMR magnetic discs.

As the material of the perpendicular magnetic recording layer used for the TAMR magnetic disks, for, for example, FePt, CoPt or the like can be used.

The heat sink layer for the TAMR magnetic disks can be provided between the perpendicular magnetic recording layer and the substrate.

The material of the heat sink layer can be Cu, Ag, Au, or an alloy containing a combination of two or more thereof.

The crystal orientation layer for the TAMR magnetic disks can be provided between the perpendicular magnetic recording layer and the substrate, or between the perpendicular magnetic recording layer and the heat sink layer. For example, MgO, ZnO, CaO or the like can be used as the crystal orientation layer.

Figure 5:
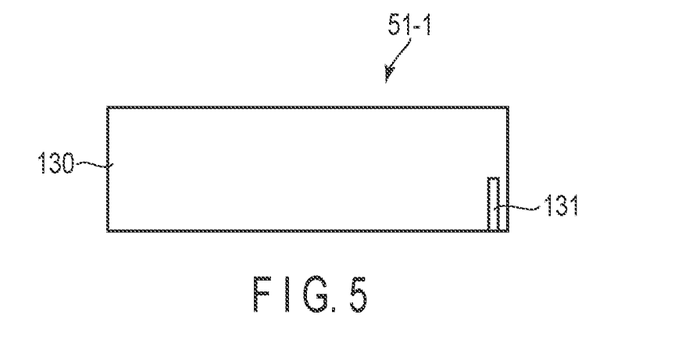
FIG. 5 is a diagram schematically showing an example of the configuration of a PMR magnetic head which can be used in the embodiment.

The PMR magnetic head 51-1 may include a main magnetic pole 131.

FIG. 5 is a diagram schematically showing an example of the configuration of a PMR magnetic head which can be used in the embodiment.

As shown in the figure, the PMR magnetic head 51-1 may include a write element with a main magnetic pole 131 which generates a magnetic field perpendicular to the surface of the magnetic disk, for example, in the head portion mounted on the slider 130. The PMR magnetic heads 51-2, 51-3 and 51-4 each may have a structure similar to the above.

For example, a microwave-assisted magnetic recording head can be used as a PMR magnetic head.

Figure 6:
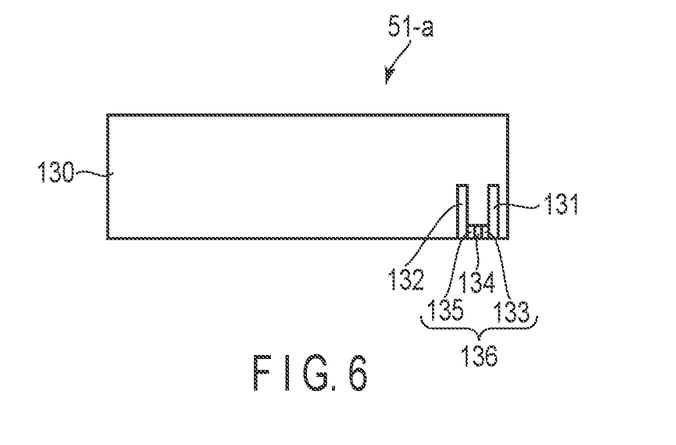
FIG. 6 is a diagram schematically showing an example of the configuration of a microwave-assisted magnetic recording head which can be used in the embodiment.

FIG. 6 is a diagram schematically showing an example of the configuration of a microwave-assisted magnetic recording head which can be used in the embodiment.

As shown, the microwave-assisted magnetic recording head may comprise a main magnetic pole 131, an auxiliary magnetic pole 132 which constitutes a magnetic circuit with the main magnetic pole 131, and a spin torque oscillation layer 136 provided between the main magnetic pole 131 and the auxiliary magnetic pole 132. The spin torque oscillation layer 136 may include a spin injection layer 133, an intermediate layer 134 and an oscillation layer 135 provided in order on the main magnetic pole 131. Alternatively, the spin torque oscillation layer 136 can be formed on the main magnetic pole in the order of the oscillation layer 135, the intermediate layer 134, and the spin injection layer 133.

The TAMR magnetic head may include a main magnetic pole, an optical near-field transducer which irradiates near-field light to the TAMR magnetic recording layer during recording, a waveguide which propagates light to the optical near-field transducer, and a light source which supplies light to the waveguide.

Figure 7:
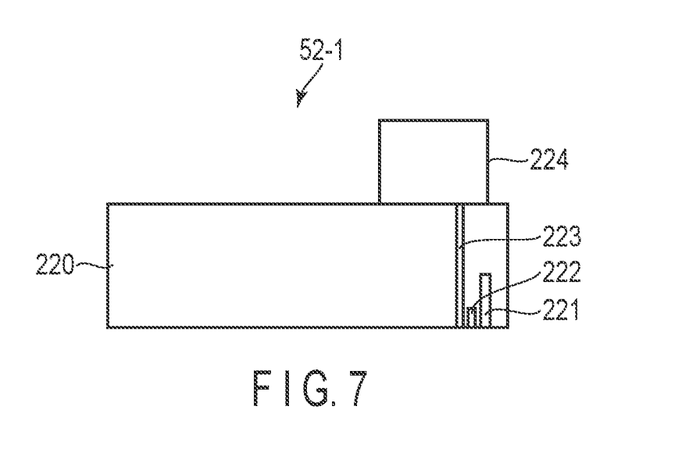
FIG. 7 is a diagram schematically showing an example of the configuration of a TAMR magnetic head which can be used in the embodiment.

FIG. 7 is a diagram schematically showing an example of the configuration of a TAMR magnetic head which can be used in an embodiment.

As shown in the figure, the light element mounted on the slider 220 may comprise a main magnetic pole 221, an optical near-field transducer 222, a waveguide 223, and a laser diode chip 224 as a light source. The laser diode chip 224 can supply light to the waveguide 223. The waveguide 223 propagates the light to the optical near-field transducer 222.

The optical near-field transducer 222 generates near-field light from the laser light propagated through the waveguide 223 and irradiates the near-field light onto the disk 40 when carrying out data writing. The irradiated near-field light heats the recording layer of the disk 40 and reduces the coercive force of the recording layer of the disk 40.

Examples of the material of the optical near-field transducer are Au, Pd, Pt, Rh, or an alloy containing a combination of two or more thereof.

Examples of the material of the waveguide are Ta2O5, SiON, etc.

As the light source, for example, a laser light source can be used.

Modified Example of the First Embodiment

Figure 8:
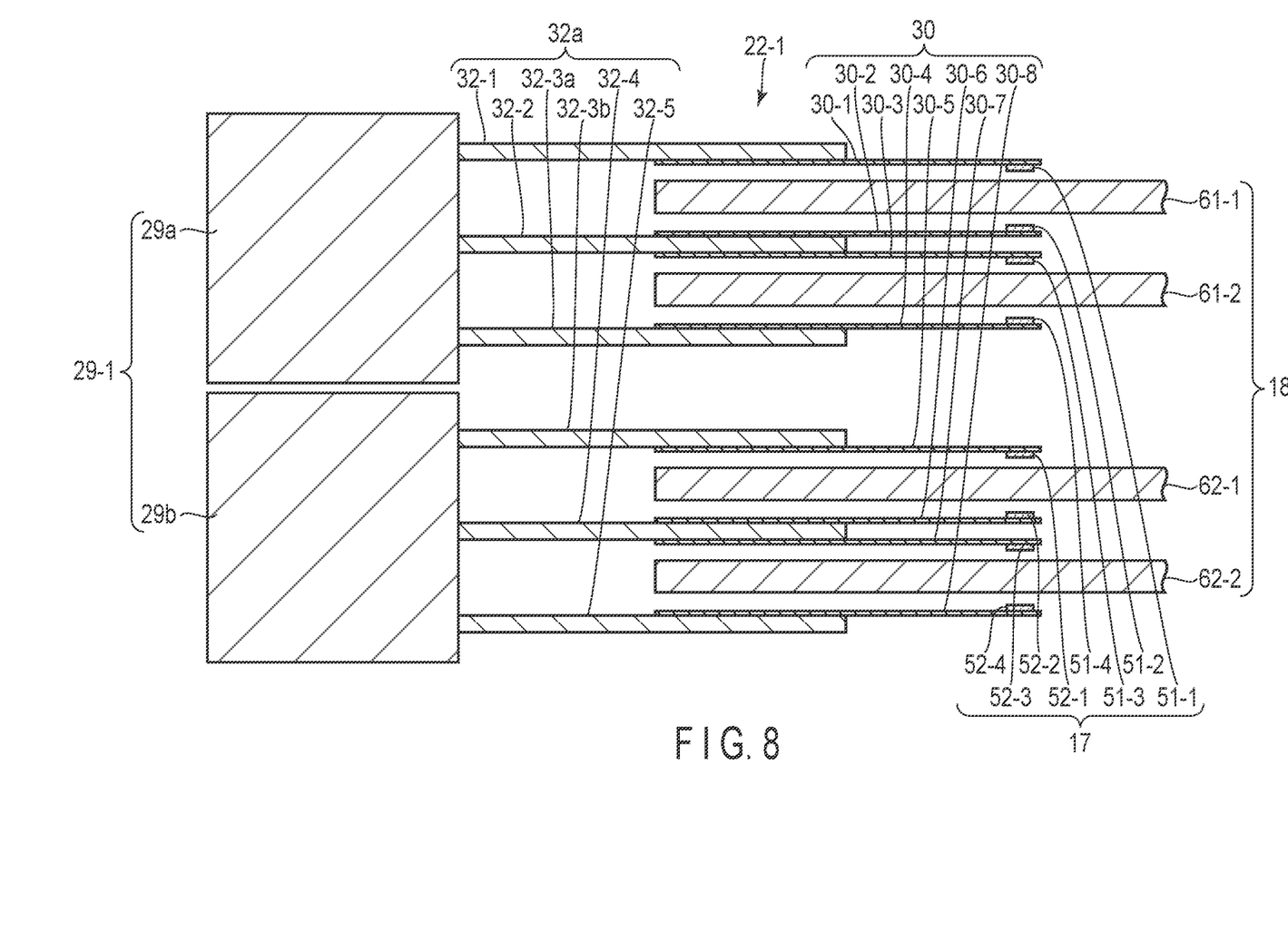
FIG. 8 is a diagram schematically showing an example of the configuration of a modification of the first embodiment.

FIG. 8 is a diagram schematically showing the configuration of the actuator assembly and magnetic disk used in a modified example of the first embodiment.

Here, for the sake of explanation, the actuator assembly 22-1 is loaded on the magnetic disks 18.

As shown in the figure, the HDD of the modified example of the first embodiment has a configuration similar to that of FIG. 1 except that the configuration of the actuator block 29-1 and the arm 32a of the actuator assembly 22-1 is different from that of the actuator block 29 and the arm 32 of the actuator assembly 22 of the modified example of the first embodiment.

The actuator assembly 22-1 used in the modified example of the first embodiment includes a plurality of actuator blocks, namely, a first actuator block 29a and a second actuator block 29b adjacent to the first actuator block 29a and driven separately, in place of the actuator block 29 of FIG. 2. From the first actuator block 29a, arms 32-1, 32-2 and 32-3a extend and arms 32-3b, 32-4 and 32-5 extend from the second actuator block 29b.

Further, to the arm 32-1, a suspension assembly 30-1 is attached, suspension assemblies 30-2 and 30-3 are attached to the arm 32-2, a suspension assembly 30-4 is attached to the arm 32-3a, a suspension assembly 30-5 is attached to the arm 32-3b, suspension assemblies 30-6 and 30-7 are attached to the arms 32-4 and a suspension assembly 30-8 is attached to the lowermost arm 32-5.

At the distal ends of the suspension assemblies 30-1, 30-2, 30-3 and 30-4, the PMR magnetic heads 51-1, 51-2, 51-3 and 51-4 are supported, respectively. At the distal ends of the suspension assemblies 30-5, 30-6, 30-7 and 30-8, the TAMR magnetic heads 52-1, 52-2, 52-3 and 52-4 are supported, respectively. The rest of the configuration, such as the arrangement of the magnetic heads and the magnetic disks, is similar to that shown in FIG. 2.

As described above, the magnetic disk device of the modified example of the first embodiment has a structure similar to that of the first embodiment, in which the PMR magnetic heads 51-1, 51-2, 51-3 and 51-4 and the TAMR magnetic heads 52-1, 52-2, 52-3 and 52-4 are provided to respectively correspond to the PMR magnetic disks 61-1 and 61-2 and the TAMR magnetic disks 62-1 and 62-2.

According to the modified example of the first embodiment, the actuator block 29 is divided into a plurality of actuator blocks, for example, a first actuator block 29a and a second actuator block 29b, as in the actuator assembly 22-1, and therefore the PMR magnetic heads 51-1, 51-2, 51-3 and 51-4 and the TAMR magnetic heads 52-1, 52-2, 52-3 and 52-4 can be moved separately. Further, as in the first embodiment, the HDD of the modified example of the first embodiment is equipped with two recording functions, the conventional PMR method and the TAMR method in one magnetic recording and reproducing device. With this structure, the concentration of write access on the TAMR magnetic head can be suppressed, and therefore, both high-density recording by the TAMR recording method and long-term reliability can be ensured at the same time.

Second Embodiment

An HDD of the second embodiment will now be described.

Figure 9:
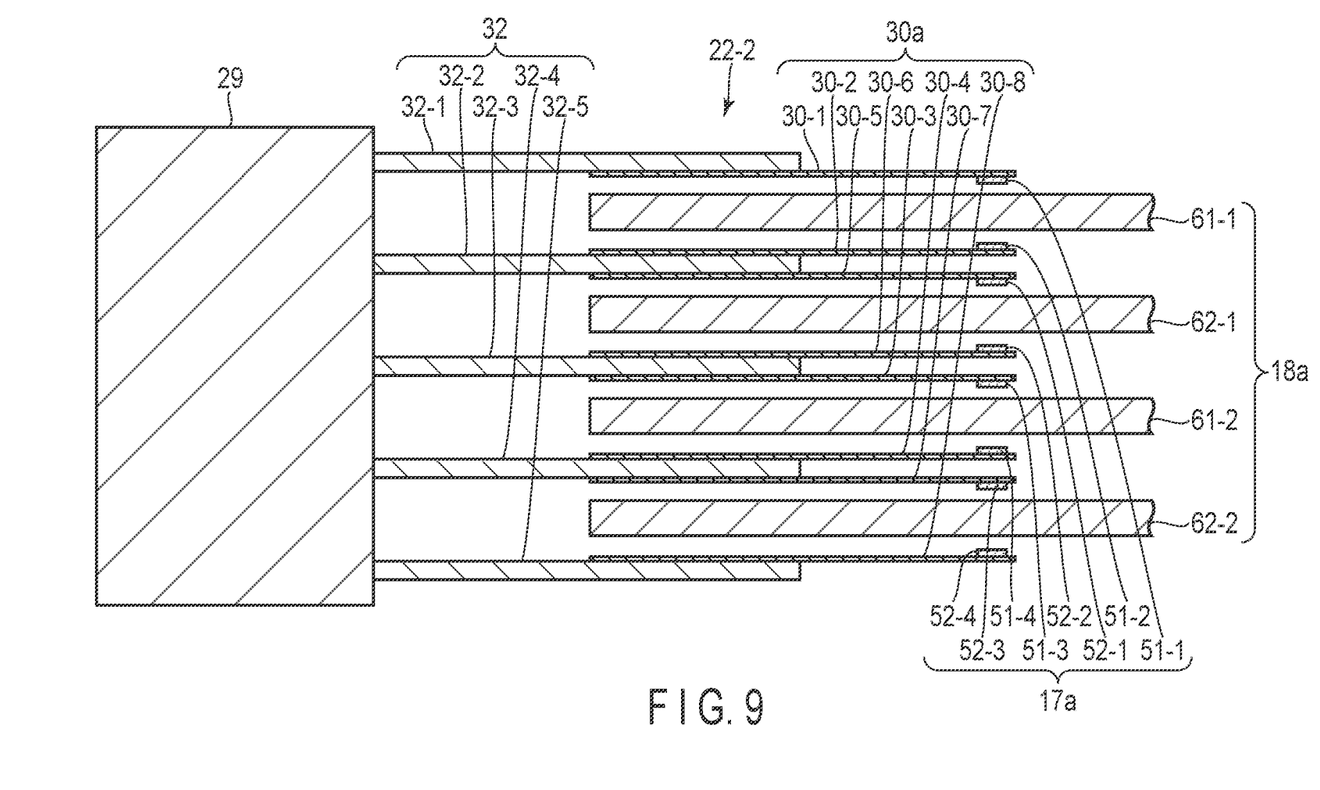
FIG. 9 is a diagram schematically showing an example of the configuration of the second embodiment.

The HDD of the second embodiment has a structure similar to that shown in FIG. 1, except that the configuration of the magnetic disk 18a and the configuration of the suspension assembly 30a of actuator assembly 22-2 and the magnetic head 17a are different from the configuration of the magnetic disk 18 and the configuration of the suspension assembly 30 and the magnetic head 17 of the actuator assembly 22 in the HDD of the first embodiment.

FIG. 9 is a diagram schematically showing the configuration of an actuator and magnetic disks used in the second embodiment.

In FIG. 9, for the sake of explanation, the actuator assembly 22-2 is loaded onto the magnetic disks 18a.

In the HDD for the second embodiment, as the magnetic disks 18a used in the second embodiment, a PMR magnetic disk 61-1, a TAMR magnetic disk 62-1, a PMR magnetic disk 61-2 and a TAMR magnetic disk 62-2 are rotatably mounted on a common spindle not shown in the figure, and are supported thereon at predetermined intervals, parallel to each other and parallel to the bottom wall of the base 12. As described, the second embodiment has a configuration in which PMR magnetic disks and TAMR magnetic disks are stacked alternately.

In the actuator assembly 22-2 used in the second embodiment, a suspension assembly is attached to a plurality of arms 32 extending from one actuator block 29 so that magnetic heads are positioned to correspond to the respective magnetic disks 18a. For example, a suspension assembly 30-1 which supports a PMR magnetic head 51-1 at its distal end is attached to an arm 32-1, and a suspension assembly 30-2 which supports a PMR magnetic head 51-2 at its distal end and a suspension assembly 30-5 which supports a TAMR magnetic head 52-1 for at its distal are attached to an arm 32-2. A suspension assembly 30-6 which supports a TAMR magnetic head 52-2 at its distal end and a suspension assembly 30-3 which supports a PMR magnetic head 51-3 at its distal end are attached to an arm 32-3. A suspension assembly 30-4 which supports a PMR magnetic head 52-2 at its distal end and a suspension assembly 30-7 which supports a TAMR magnetic head 52-3 at its distal end are attached to an arm 32-4. A suspension assembly 30-8 that supports a TAMR magnetic head 52-4 at its distal end is attached to an arm 32-5.

The PMR magnetic heads 51-1 and 51-2 are provided to oppose each other while interposing the PMR magnetic disk 61-1 therebetween. The TAMR magnetic heads 52-1 and 52-2 are provided so as to oppose each other while interposing the TAMR magnetic disk 62-1 therebetween during recording. The PMR magnetic heads 51-3 and 51-4 are provided so as to oppose each other while interposing the PMR magnetic disk 61-2. The TAMR magnetic heads 52-3 and 52-4 are provided so as to oppose each other while interposing the TAMR magnetic disk 62-2 therebetween.

Here, the PMR magnetic head 51-2 and the TAMR magnetic head 52-1 are adjacent to each other back-to-back and so are the TAMR magnetic head 52-2 and the PMR magnetic head 51-3 and the PMR magnetic head 51-4 and the TAMR magnetic head 52-4. In the HDD of the second embodiment, all the magnetic heads adjacent to each other back to back are combinations of TAMR magnetic heads and PMR magnetic heads, and do not include combinations of TAMR magnetic heads and TAMR magnetic heads.

Figure 10:
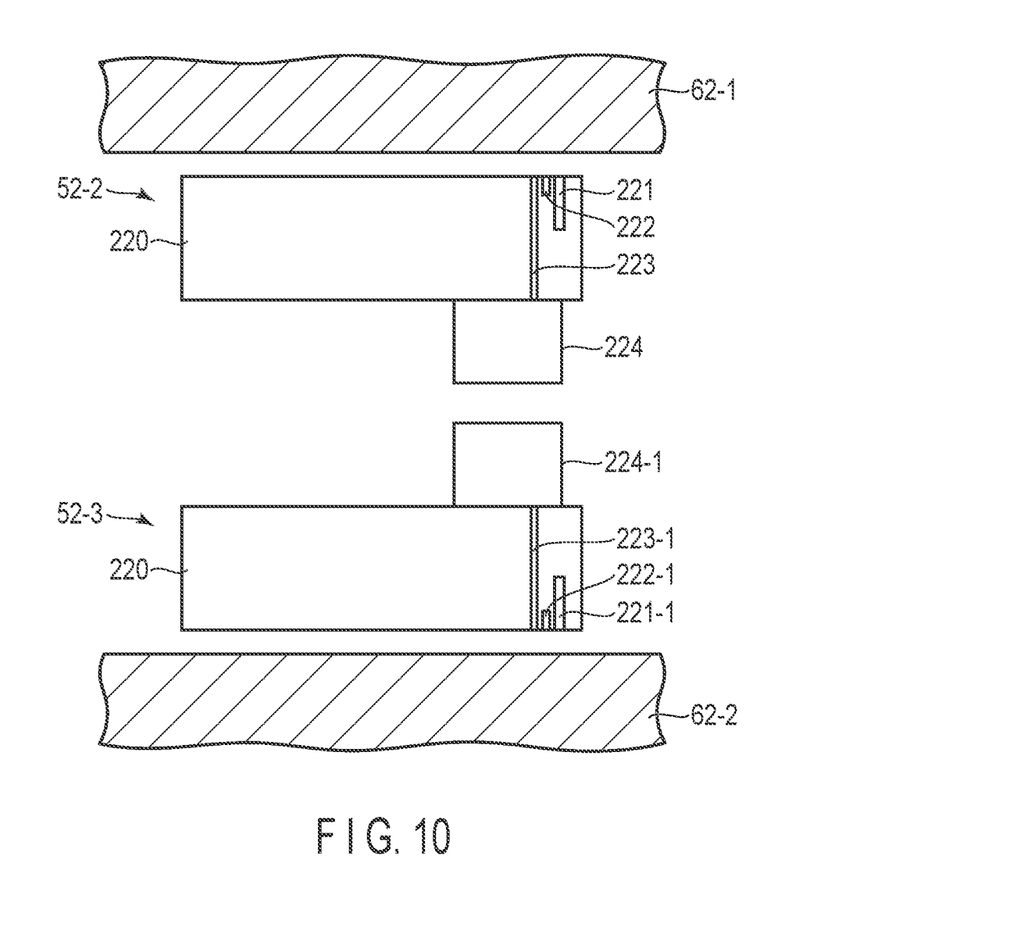
FIG. 10 is a diagram illustrating a state in which a TAMR magnetic head and a TAMR magnetic head are adjacent to each in FIG. 2.
Figure 11:
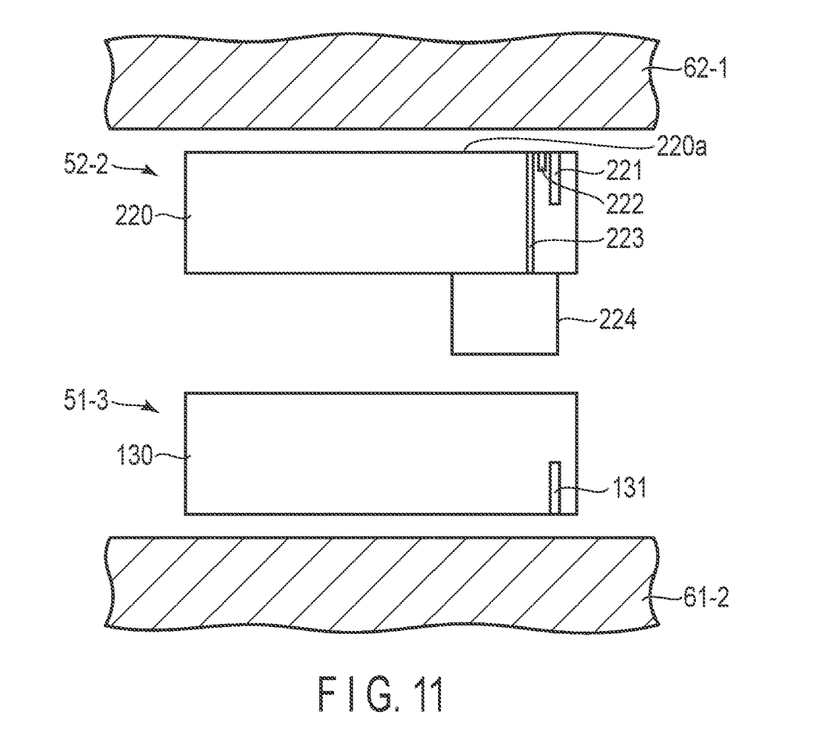
FIG. 11 is a diagram illustrating a state in which a TAMR magnetic head and a PMR magnetic head are adjacent to each other in FIG. 9.

FIG. 10 is a diagram illustrating the state of the TAMR magnetic head 52-2 and TAMR magnetic head 52-3 in FIG. 2 are adjacent to each other. FIG. 11 is a diagram illustrating the state of the TAMR magnetic head 52-2 and the PMR magnetic head 51-3 in FIG. 9 are adjacent to each other.

The TAMR magnetic heads 52-2 and 52-3 have a configuration similar to that of the TAMR magnetic head 52-1 shown in FIG. 6, and the PMR magnetic head 51-3 has a configuration similar to that of the PMR magnetic head 51-1 shown in FIG. 5. Note that in FIGS. 10 and 11, the suspension is omitted for the sake of explanation.

As shown in the figures, in the TAMR magnetic heads 52-2 and 52-3, the area opposite to the levitation surface 220a of the slider is protruded by the laser diode chip 224. Therefore, for example, as shown in FIG. 10, when the TAMR magnetic heads 52-2 and 52-3 are adjacent to each other, the laser diode chip 224 and the laser diode chip 224-1 are located to oppose each other. In this case, in order to secure the margin between the TAMR magnetic heads 52-2 and 52-3, which should be taken for assembling and vibration without increasing the size of the device, the processing including alignment become complicated.

In contrast, as shown in FIG. 11, when the TAMR magnetic head 52-2 and the PMR magnetic head 51-3 are adjacent to each other, the laser diode chip 224 is only on one side and therefore the margin between the TAMR magnetic head 52-2 and the PMR magnetic head 51-3 can be easily secured.

Thus, according to the second embodiment, the PMR magnetic disks and the TAMR magnetic disks are alternately stacked so that each of the adjacent pairs of magnetic heads is a combination of a TAMR magnetic head and a PMR magnetic head. With this structure, the laser diode chips do not oppose each other, and therefore the margin between magnetic heads can be better secured. Further, as in the first embodiment, the HDD of the second embodiment is equipped with two recording functions, the conventional PMR method and the TAMR method in a single magnetic recording and reproducing device. Thus, the concentration of write access to the TAMR magnetic head can be suppressed, enabling both high recording density by the TAMR method and long-term reliability at the same time.

Third Embodiment

According to the magnetic recording and reproducing device of the third embodiment, in the HDD that includes a PMR magnetic disk, a PMR magnetic head, a TAMR magnetic disk and a TAMR magnetic head, the PMR magnetic disk and the TAMR magnetic disk each can be set for recording using at least one of a conventional magnetic recording (CMR) method in which recordings are carried out so that adjacent tracks do not overlap, and a shingled magnetic recording (SMR) method, in which recordings are carried out so that adjacent tracks partially overlap. When recording is performed using the shingled magnetic recording method, the size of the area to be recorded using the shingled magnetic recording method can be made larger on the recording surface of the TAMR magnetic disk than on the recording surface of the PMR magnetic disk.

The HDD for the third embodiment is an example of a magnetic recording and reproducing device using the shingled magnetic recording method, and the PMR magnetic disks are set to record by the CMR method, whereas the TAMR magnetic disks are set to record by the SMR method.

Figure 12:
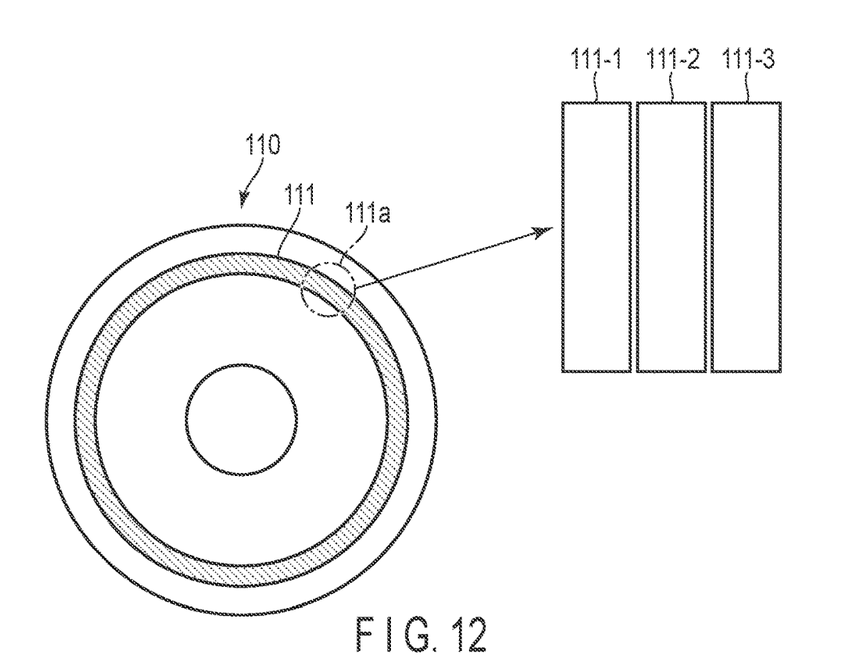
FIG. 12 is a diagram illustrating a recording method of the PMR magnetic disk in the third embodiment.
Figure 13:
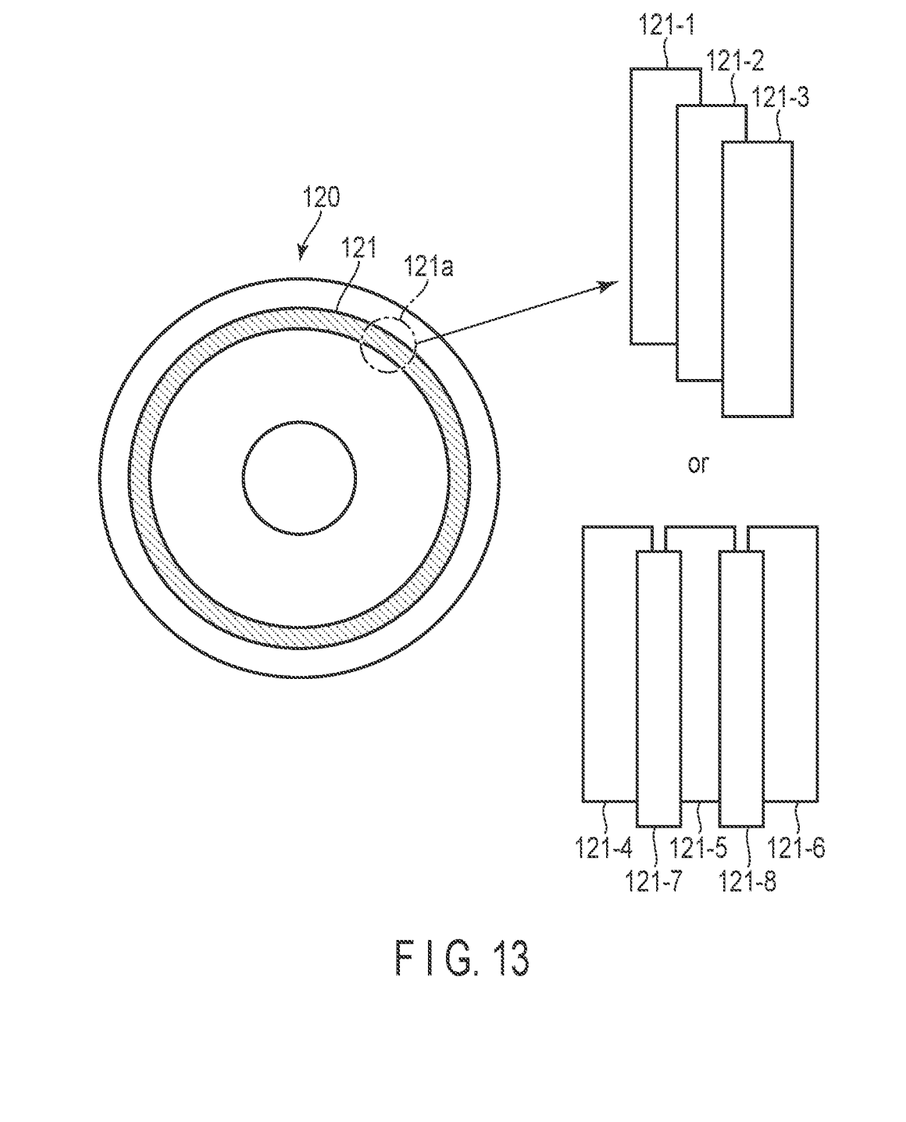
FIG. 13 is a diagram illustrating a recording method of the TAMR magnetic disk in the third embodiment.

FIG. 12 is a diagram illustrating the recording method for the PMR magnetic disk in the third embodiment. FIG. 13 is a diagram illustrating the recording method for the TAMR magnetic disk in the third embodiment.

In FIG. 12, tracks 111-1, 111-2 and 111-3 represent adjacent tracks within a region 111a in a plurality of tracks 111 of a PMR magnetic disk 110 used in the third embodiment. As shown in the figure, the PMR magnetic disk 110 used in the third embodiment is set to record by the CMR method, in which recordings are carried out so that the adjacent tracks 111-1, 111-2 and 111-3 do not overlap.

In FIG. 13, tracks 121-1, 121-2 and 121-3 represent adjacent tracks in a region 121a in a plurality of tracks 121 of a TAMR magnetic disk 120 used in the third embodiment. As shown in the figure, in the TAMR magnetic disk 120 used in the third embodiment, recordings are carried out by the SMR method, in which tracks partially overlap as in the adjacent tracks 121-1, 121-2 and 121-3. In this shingled magnetic recording method, the adjacent tracks 121-1, 121-2 and 121-3 overlap in order, but in place of the tracks 121-1, 121-2 and 121-3, an interlaced magnetic recording (IMR) method, in which tracks alternately overlap each other such as tracks 121-4, 121-7, 121-5, 121-8 and 121-6, can be used. In the IMR method, data is recorded on wide-bottom tracks 121-4, 121-5 and 121-6, and then the data is recorded on top tracks 121-7 and 121-8, which are interlaced with the bottom tracks 121-4, 121-5 and 121-6. Thus, the track density is improved, enabling higher recording capacity. Note that the SMR method is often referred to as a method in which tracks are overlapped in order, such as tracks 121-1, 121-2 and 121-3. But, the IMR method, in which tracks overlap each other, can also be considered as that recordings are carried out so that tracks partially overlap, and therefore it is considered to be included in the SMR method.

The HDD of the third embodiment is equipped with two recording functions, the conventional PMR method and the TAMR method in a single magnetic recording and reproducing device. Here, for example, when setting the method for storing data on a magnetic disk from a host computer connected to the magnetic recording and reproducing device, hot data with high access frequency, for which random access performance is important, can be recorded by on the PMR magnetic disk 110 by the CMR method. On the other hand, since cold data, which is accessed less frequently, does not require such a high random access performance as that of hot data, it is recorded on the TAMR magnetic disk 120 by the SMR or IMR method. Thus, the concentration of write access to the TAMR magnetic head can be suppressed, further improving the track density and recording density while ensuring long-term reliability.

Fourth Embodiment

The HDD of the fourth embodiment is another example of a magnetic recording and reproducing device using the shingled magnetic recording method. The PMR magnetic disks and the TAMR magnetic disks are each set to record using the CMR method, SMR method or IMR method.

Further, on the recording surface, the size of the area recorded by the SMR or IMR method with respect to the area recorded by the CMR method is set to be larger in the TAMR magnetic disks than in the PMR magnetic disks.

Figure 14:
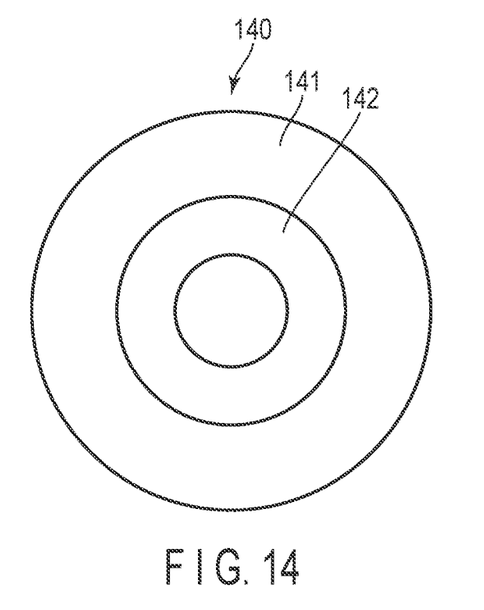
FIG. 14 is a diagram illustrating a recording method of the PMR magnetic disk in the fourth embodiment.
Figure 15:
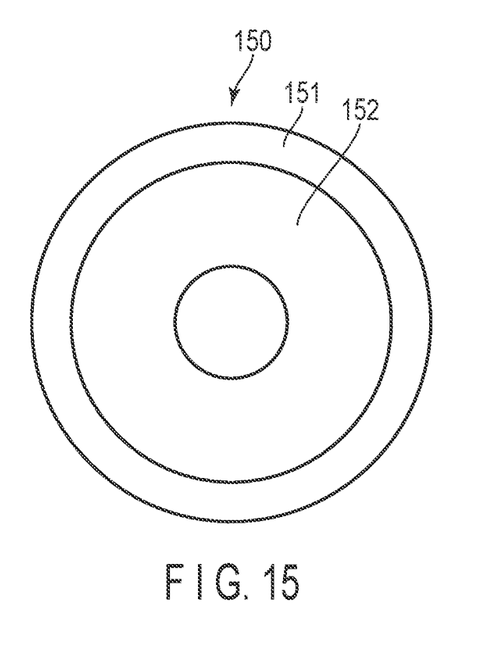
FIG. 15 is a diagram illustrating a recording method of the TAMR magnetic disk in the fourth embodiment.

FIG. 14 is a diagram illustrating the recording method used for PMR magnetic disks in the fourth embodiment. FIG. 15 is a diagram illustrating the recording method used for TAMR magnetic disks in the fourth embodiment.

In FIG. 14, the track area 141 represents an area to be recorded by the CMR method on the recording surface of the PMR magnetic disk used in the fourth embodiment, and the track area 142 represents an area to be recorded by the SMR or IMR method on the recording surface of the PMR magnetic disk in the fourth embodiment. As shown in the figure, the track area 142 is set to be smaller than the track area 141.

In FIG. 15, the track area 151 represents an area to be recorded by the CMR method on the recording surface of the TAMR magnetic disk used in the fourth embodiment, and the track area 152 represents an area to be recorded by the SMR or IMR method on the recording surface of the TAMR magnetic disk in the fourth embodiment. As shown in the figure, the track area 152 is larger than the track area 151.

As shown in the figure, in the HDD of the fourth embodiment, the size of the track area 152 is set larger than the size of the track area 142, and the size of the area recorded by the SMR method or the IMR method with respect to the area recorded by the CMR method on the recording surface is larger in the TAMR magnetic disk than in the PMR magnetic disk.

The HDD for the fourth embodiment is equipped with two recording functions, the conventional PMR method and the TAMR method in one single magnetic recording and reproducing device. Here, for example, when setting the method for storing data on the magnetic disk from the host computer connected to the magnetic recording and reproducing device, hot data with high access frequency, for which the random access performance is important, can be recorded by the CMR method. Cold data, which is accessed less frequently, does not require such a high random access performance as that of hot data, and therefore it can be recorded by the SMR or IMR method.

For example, when used in a data center, the balance between hot data with high access frequency and cold data with low access frequency may change depending on the operational conditions. In such a case, according to the fourth embodiment, depending on the operational conditions, when random access performance is required, the area to be recorded by CMR cab be enlarged, whereas when capacity is required, the area to be recorded by SMR or IMR can be enlarged. Further, it is possible to set on the host side so that the SMR or IMR area of the TAMR magnetic disk surface is larger than the SMR or IMR area of the PMR magnetic disk surface. In this manner, with the use of the fourth embodiment, the track density is improved, enabling higher recording capacity. Further, it is further possible to meet the changing demands of operational conditions while suppressing the concentration of write access by the TAMR head to ensure long-term reliability.

The fourth embodiment shows an example of recording using the CMR method and the SMR method or the IMR method on the PMR magnetic recording media and the TAMR magnetic recording media. As a modified example, for example, the CMR method can be used for the PMR magnetic recording media, and the CMR method and the SMR method or the IMR method can be used for the TAMR magnetic recording media. Or the CMR method and the SMR method or the IMR method can be used for the PMR magnetic recording media and the SMR method or the IMR method can be used for the TAMR magnetic recording media. Or, it is also possible to use both the SMR method and the IMR method in place of using one of the SMR method or the IMR method, if necessary.

Further, it is possible to incorporate the PMR and TAMR magnetic recording media used in the third or fourth embodiment into the magnetic recording and reproducing device of the first, second, or third embodiment, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording and reproducing device comprising, in a single magnetic recording and reproducing device:
a perpendicular magnetic recording medium;
a perpendicular magnetic recording head;
a thermal assisted magnetic recording medium; and
a thermal assisted magnetic recording head,
wherein the perpendicular magnetic recording medium comprises a soft magnetic layer provided on a substrate and a perpendicular magnetic recording layer provided on the soft magnetic layer,
the thermal assisted magnetic recording medium comprises a heat sink layer provided on a substrate and a thermal assisted magnetic recording layer provided on the heat sink layer, and
the thermal assisted magnetic recording head comprises a main magnetic pole, an optical near-field transducer which irradiates near-field light to the thermal assisted magnetic recording layer during recording, a waveguide which propagates light to the optical near-field transducer, and a light source which supplies light to the waveguide.

2. The device of claim 1, further comprising:
a first actuator block which moves the perpendicular magnetic recording head; and
a second actuator block which moves the thermal assisted magnetic recording head.

3. The device of claim 1, wherein
the perpendicular magnetic recording medium and the thermal assisted magnetic recording medium are alternately stacked.

4. A magnetic recording and reproducing device comprising, in a single magnetic recording and reproducing device:
a perpendicular magnetic recording medium;
a perpendicular magnetic recording head;
a thermal assisted magnetic recording medium; and
a thermal assisted magnetic recording head,
wherein the perpendicular magnetic recording medium and the thermal assisted magnetic recording medium are each recorded using at least one of a conventional recording method, in which recording is carried out without overlapping adjacent tracks and a shingled magnetic recording method, in which recording is carried out while partially overlapping adjacent tracks, and a size of an area to be recorded by the shingled magnetic recording method is larger on a recording surface of the thermal assisted magnetic recording medium than on a recording surface of the perpendicular magnetic recording medium.

5. The device of claim 4, wherein the perpendicular magnetic recording medium is subjected to recording using the conventional recording method in which the recording is carried out on adjacent tracks without overlapping, and the thermal assisted magnetic recording medium is subjected to recording using the shingled magnetic recording method in which the recording is carried out while partially overlapping adjacent tracks.

6. The device of claim 4, wherein at least one of the shingled magnetic recording method, in which recording is carried out while partially overlapping adjacent tracks in order, and an interlaced magnetic recording method, in which after recording on a bottom track, recording is carried out while overlapping a top track interlaced with the bottom track, is applied as the shingled magnetic recording method.

7. The device of claim 4, wherein the perpendicular magnetic recording head is a microwave-assisted recording head, and the conventional recording method is a microwave-assisted recording method.

8. The device of claim 4, wherein the perpendicular magnetic recording medium comprises a soft magnetic layer provided on a substrate and a perpendicular magnetic recording layer provided on the soft magnetic layer,
the thermal assisted magnetic recording medium comprises a heat sink layer provided on a substrate and a thermal assisted magnetic recording layer provided on the heat sink layer; and
the thermal assisted magnetic recording head comprises a main magnetic pole, an optical near-field transducer which irradiates near-field light to the thermal assisted magnetic recording layer during recording, a waveguide which propagates light to the optical near-field transducer, and a light source which supplies light to the waveguide.

9. The device of claim 4, further comprising:
a first actuator block which moves the perpendicular magnetic recording head; and
a second actuator block which moves the thermal assisted magnetic recording head.

10. The device of claim 4, wherein the perpendicular magnetic recording medium and the thermal assisted magnetic recording medium are alternately stacked.

* * * * *